United States Patent [19]
Tokuda et al.

[11] Patent Number: 5,642,103
[45] Date of Patent: Jun. 24, 1997

[54] TRANSPONDER USED IN A REMOTE IDENTIFICATION SYSTEM

[75] Inventors: Masamori Tokuda, Tenri; Hiroshi Nakano, Nara; Tomozo Ohta, Ikoma, all of Japan

[73] Assignee: Sharp Kabushiki Kaisha, Osaka, Japan

[21] Appl. No.: 267,291

[22] Filed: Jun. 14, 1994

Related U.S. Application Data

[63] Continuation of Ser. No. 763,243, Sep. 20, 1991, abandoned.

[30] Foreign Application Priority Data

Oct. 1, 1990 [JP] Japan .................................. 2-264671

[51] Int. Cl.[6] .................................................. H04Q 7/00
[52] U.S. Cl. .................. 340/825.54; 235/380; 235/491; 342/44; 342/51; 342/361
[58] Field of Search ...................... 340/825.54; 359/169; 343/700 MS; 235/379, 380, 383, 491; 342/44, 50, 51, 361

[56] References Cited

U.S. PATENT DOCUMENTS

| | | | |
|---|---|---|---|
| 4,628,324 | 12/1986 | Gross et al. | 343/788 |
| 4,667,087 | 5/1987 | Quintana | 235/380 |
| 4,755,820 | 7/1988 | Backhouse et al. | 343/700 MS |
| 4,777,490 | 10/1988 | Sharma et al. | 343/700 MS |
| 4,780,724 | 10/1988 | Sharma et al. | 343/700 MS |
| 4,926,187 | 5/1990 | Sugawara et al. | 342/44 |
| 4,983,976 | 1/1991 | Ogata et al. | 342/44 |
| 5,021,790 | 6/1991 | Ohta et al. | 342/44 |
| 5,053,774 | 10/1991 | Schuermann et al. | 342/51 |
| 5,119,099 | 6/1992 | Haruyama et al. | 342/51 |
| 5,181,025 | 1/1993 | Ferguson et al. | 343/700 MS |

FOREIGN PATENT DOCUMENTS

| | | | |
|---|---|---|---|
| 60-55461 | 3/1985 | Japan | 235/380 |
| 141980 | 2/1989 | Japan | 235/491 |
| 3186987 | 8/1991 | Japan | 235/383 |
| 2180677 | 4/1987 | United Kingdom . | |
| 2191029 | 12/1987 | United Kingdom . | |
| 2212965 | 2/1989 | United Kingdom . | |

OTHER PUBLICATIONS

1990 IEEE MTT-S International Microwave Symposium Digest vol. II (May8-10, 1990 Dallas Convention Center, Dallas, Texas Krishna K. Agarwal, Publications Chairman.

*Primary Examiner*—Brent A. Swarthout
*Assistant Examiner*—Andrew Hill

[57] ABSTRACT

A transponder used in a remote identification system requiring an interrogator and a transponder. The transponder which is thin and compact includes a transmit/receive antenna which is thin for receiving an interrogating signal and a rewrite signal emitted from the interrogator, and for emitting a response signal towards the interrogator. There is a modulator/demodulator for modulating a signal according to a code inherent in the transponder to emit the same from the antenna as the response signal without newly applying energy to the interrogating signal, and for demodulating the rewrite signal. A controller for applying a modulating signal generated according to the inherent code to the modulator/demodulator and for storing a signal demodulated by the modulator/demodulator. A liquid crystal display is used for displaying data including bar codes which can be read by a bar code reader. The bar code can be rewritten.

5 Claims, 7 Drawing Sheets

TRANSPONDER USED IN A REMOTE IDENTIFICATION SYSTEM

This application is a continuation of application Ser. No. 07/763,243 filed on Sep. 20, 1991, now abandoned.

BACKGROUND OF THE INVENTION

1. Field of the Invention

The present invention relates to a remote identification system carrying out data reception/transmission without physical contact between an interrogator and a transponder arranged in a relatively close distance, and more particularly to an improvement of a transponder used in the system.

2. Description of the Background Art

A remote identification system for identifying a mobile unit without physical contact via electromagnetic wave and light wave by attaching a special device to the mobile unit is showing significant progress in accordance with the drastic development of electronic technology. Such a remote identification system is used, not only in the field of manufacturing and distribution, but also in various fields such as to monitor vehicles on superhighways, and the entry/egress and the travel of people.

FIG. 6 shows a remote identification system comprising a transponder 5 attached to a mobile unit 51, and an interrogator 4 of the fixed side. Interrogator 4 comprises a transmit/receive antenna 401, a transmitter/receiver 402, and a controller 403, which are controlled by an external input/output terminal device 6. Transponder 5 has an inherent code written therein in advance. Upon receiving an interrogating signal from interrogator 4, transponder 5 modulates the received signal according to the inherent code to retransmit the same as a response signal. Interrogator 4 receives this response signal to demodulate the code to identify what the mobile unit 51 is. It is possible to rewrite the code in transponder 5 without physical contact in recent systems.

The remote identification system is given attention particularly in the field of manufacturing where the need of reduction in production time and cost by automation of the production lines are great, and where production of various products of small quantity and improvement in quality are greatly required due to the variety of consumers needs. In these manufacturing fields, transponder 5 is attached to the products transported through the production process or to palettes where the products are mounted. The mobile units are identified by reading out the data in transponder 5 at each processing step, whereby working instructions regarding the mobile units are issued to robots, automatic machines, or to the working party. The information generated at each processing step (for example, examination data) can be written into transponder 5. These data may be gathered afterwards. This will eliminate the need to access the host computer at each processing step to reduce significantly the load of the host computer. By combining the product and the information, efficient production control can be achieved.

Specific examples of a remote identification system are the bar code reader system, the system carrying out reception/transmission by light wave, and the system using electromagnetic wave of the medium frequency range. Each of these systems will be explained hereinafter.

FIG. 7 is a circuit block diagram showing a structure of a bar code reader system. The bar code reader system comprises a bar code reader 4a, a bar code 5a, and an external input/output terminal device 6. In order to read bar code 5a with bar code reader 4a, light waves from a light emitting diode (LED) or laser of a light emitting element 414 scans bar code 5a. Light wave such as of the LED is absorbed in the black portion of bar code 5a and reflected at the white portion of bar code 5a. The reflected light from bar code 5a is intensity-modulated according to the code, i.e. modulated by amplitude shift keying (ASK). This reflected light entering a photodetector 415 of bar code reader 4a causes photodetector 415 to be turned on or off according to the intensity of light, whereby the pattern of bar code 5a can be decoded by a demodulator 413. This decoded signal is sent to controller 411, where the information indicated by bar code 5a is recognized. Visible light LED, infrared LED, visible light semiconductor laser and the like can be used as light emitting element 414. Light emitting element 414 is activated by controller 411 and a light emitting element driving circuit 412.

Such a bar code reader system has the advantages of low cost and extremely thin configuration of bar code 5a, which can be used semi-permanently. Therefore, the bar code system is widely used particularly in the field of distribution.

FIG. 8 is a circuit block diagram of a structure of a remote identification system carrying out transmission/reception by light wave. The remote identification system comprises an interrogator 4b, a transponder 5b, and an external input/output terminal device 6. In order to read out data in a memory 526 of transponder 5b, a modulation signal according to the transmitted data is generated by controller 523, whereby this modulation signal is applied to an optical modulation circuit 525. In the case of transmitting a signal by ASK, light emitting element 524 emits or not emits light wave if the modulation signal is at a high potential or a low potential, respectively. This light signal is received by photodetector 425 in interrogator 4b to be demodulated to the original data by demodulator 423. The demodulated data is supplied to controller 421, where the memory contents of transponder 5b is recognized.

Conversely, in the case of the transmitting data from interrogator 4b to transponder 5b, a modulation signal according to the transmission data is generated by controller 421. This modulation signal is applied to optical modulation circuit 422. In the case the signal is transmitted by ASK, light emitting element 424 is turned on or off according to a high level or a low level of the modulation signal. This light signal is received by photodetector 521 of transponder 5b to be demodulated to the original data by demodulator 522. The demodulated data is provided to controller 523. If this received data should be stored, it is transmitted to memory 526 to be stored. Near-infrared LED is often used as light emitting elements 424 and 524.

This remote identification system utilizing optical communication has the benefits of being immune to interference of adjacent other systems due to its sharp directivity. There is also an advantage that the cost of the interrogator is low, and that data reading/rewriting is possible. Therefore, the remote identification system utilizing optical communication is often used in production lines of domestic electric equipments and office automation equipments.

FIG. 9 is a circuit block diagram showing a structure of a remote identification system utilizing electromagnetic wave of the medium frequency range. This remote identification system comprises an interrogator 4c, a transponder 5c, and an external input/output terminal device 6. Interrogator 4c reads out data stored in memory 536 of transponder 5c as follows. A carrier wave from an oscillator 432 is amplified by an amplifier 434 to be emitted as an interrogating signal from transmit antenna 435. In this case, modulator 433 just passes the carrier wave as it is. At the transponder 5c side, the interrogating signal is received by receive antenna 531 to be amplified by an amplifier 532. The amplified interrogating signal is applied to a frequency divider 535 to have the frequency thereof divided into a half, whereby the same is provided to modulator 537. Modulator 537 is also applied with a modulation signal generated by controller 534 according to data read out from memory 536. The interrogating signal frequency-divided into a half is modulated by the modulation signal and then amplified by amplifier 538. This amplified signal is re-emitted as a response signal from transmit antenna 539. At the interrogator 4c side, the response signal is received by receive antenna 436 to be amplified by an amplifier 437. The amplified signal is demodulated into the original data by demodulator 438. The demodulated data is provided to controller 431, whereby the data of transponder 5c is recognized.

In transmitting data from interrogator 4c to transponder 5c, a carrier wave from oscillator 432 is modulated by modulator 433. A modulation signal is generated by controller 431 according to the transmission data. The modulated carrier is amplified by amplifier 434 to be emitted from transmit antenna 435 as a rewrite signal. At transponder 5c side, the rewrite signal is received by receive antenna 531 to be amplified by amplifier 532. The amplified signal is demodulated into the original data by demodulator 533 to be applied to controller 534. This received data will be provided to be stored in memory 536 if required.

This remote identification system utilizing an electromagnetic wave of the medium frequency range has an advantage that data reading/rewriting is possible. There are also advantages that the communication distance is not so critical, it is not necessary to increase the attaching accuracy of the transponder since the electromagnetic wave is substantially omnidirectional, and it is hardly affected by oil stain and dirt. The remote identification system using electromagnetic wave of the medium frequency range is used in the production lines of automobiles having a relatively inferior working environment.

The bar code reader system of FIG. 7 has various disadvantages such as the bar code cannot be rewritten, the amount of data that can be included in the bar code is limited, the communication distance is short, the attaching face of the bar code is limited, the attaching accuracy of the bar code is critical, the readout of the bar code may be impossible due to oil stain, dirt and blocking objects, and the bar code itself cannot be read and understood by a person.

The remote identification system by optical communication of FIG. 8 has various disadvantages such as the attaching accuracy of the transponder becomes critical if the communication distance is long due to its sharp directivity, the lifetime of the battery of the transponder side is reduced since the conversion efficiency of light/electric is low, communication becomes impossible due to oil stain, dirt and blocking objects, and the data inside the transponder cannot be directly read out by a person.

The remote identification system utilizing electromagnetic wave of the medium frequency range of FIG. 9 has various disadvantages such as the cost of the interrogator and the transponder are high, the lifetime of the battery of the transponder becomes shorter since the transponder amplifies and transmits the response signal, the antenna must be large-sized to increase the communication distance, and the data in the transponder cannot be directly read out by a person.

SUMMARY OF THE INVENTION

In view of the problems of the prior art, an object of the present invention is to provide a transponder that has the lifetime of the battery increased significantly.

Another object of the present invention is to provide a transponder that can be manufactured at a relatively low cost.

A further object of the present invention is to provide a transponder that allows a personnel to read the data directly.

Yet another object of the present invention is to provide a transponder that is thin and compact.

According to the present invention, there is provided a transponder used in a remote identification system requiring an interrogator and a transponder, including: a transmit/receive antenna for receiving an interrogating signal or a rewrite signal emitted from an interrogator and emitting a response signal to the interrogator; a modulator/demodulator for modulating an interrogating signal according to a code inherent in the transponder to emit the same as a response signal from the antenna without newly applying energy to the interrogating signal, and for demodulating the rewrite signal; a controller for applying a modulation signal generated according to an inherent code to the modulator/demodulator, and for storing a signal demodulated by the modulator/demodulator; and a display for displaying various data according to an instruction of the controller.

The transponder according to the present invention includes a modulator/demodulator modulating an interrogating signal according to a code inherent in the transponder whereby the modulated signal is emitted from the antenna as a response signal, without having to newly apply energy to the interrogating signal. Therefore, the transponder requires almost no power so that the lifetime of the battery of the transponder is expanded drastically. By displaying characters on a display, the personnel can obtain instructions directly of the working process. By displaying a bar code on the display, the usage of a bar code reader is possible.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
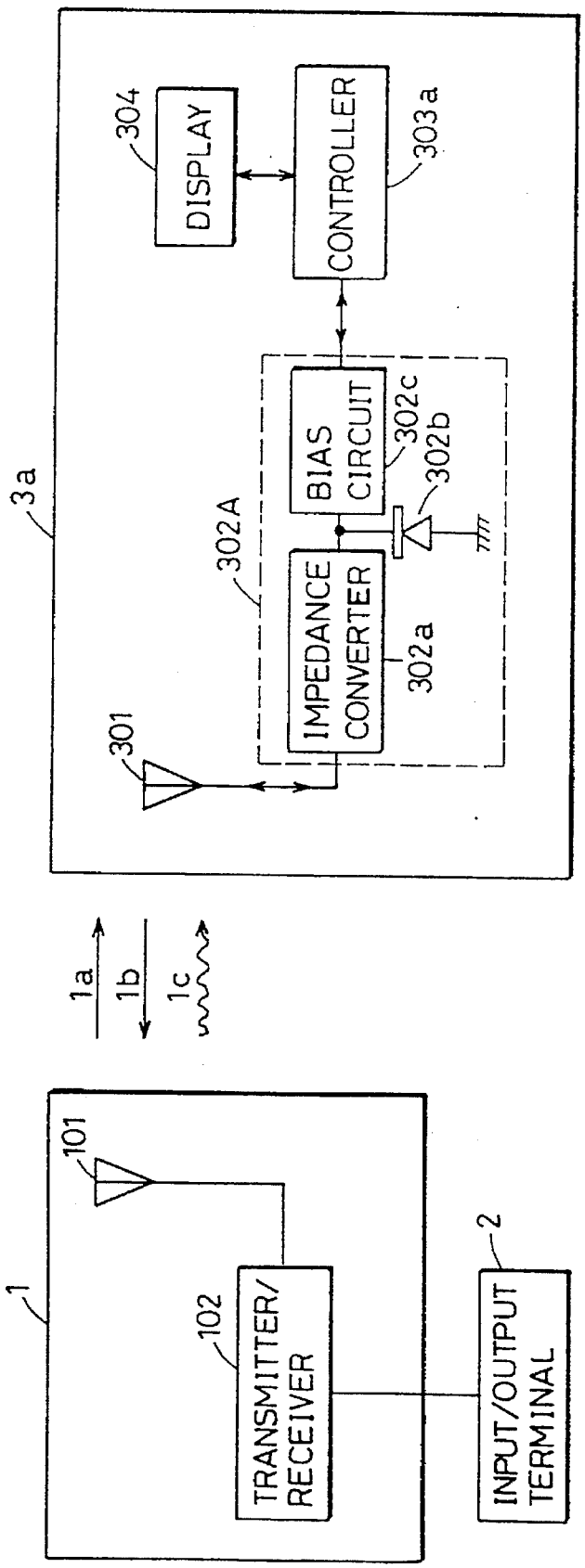
FIG. 1 is a circuit block diagram of a transponder according to a first embodiment of the present invention.

A remote identification system according to a first embodiment of the present invention will be explained hereinafter with reference to FIG. 1. Referring to FIG. 1, an interrogator 1 comprises an antenna 101 and a transmitter/receiver 102 which is connected to an external input/output terminal device 2. A transponder 3a comprises a transmit/receive antenna 301, an impedance converter 302a, a diode 302b, a bias circuit 302c for applying a modulation signal to diode 302b and for providing a signal demodulated by diode 302b, a controller 303a, and a display 304. Impedance converter 302a, diode 302b, and bias circuit 302c implement a modulator/demodulator 302A.

Interrogator 1 reads out data in transponder 3a as follows. An instruction for reading out data is provided from input/output terminal device 2 to transmitter/receiver 102 of interrogator 1. An unmodulated carrier is provided from an oscillator in transmitter/receiver 102 to be emitted from antenna 101 as interrogating signal 1a. At the transponder 3a side, interrogating signal 1a is received by transmit/receive antenna 301 to be provided to modulator/demodulator 302A. The data of transponder 3a is stored in controller 303a. A modulation signal according to a transmission data is generated by controller 303a. This modulation signal is applied to diode 302b via bias circuit 302c.

Figure 3:
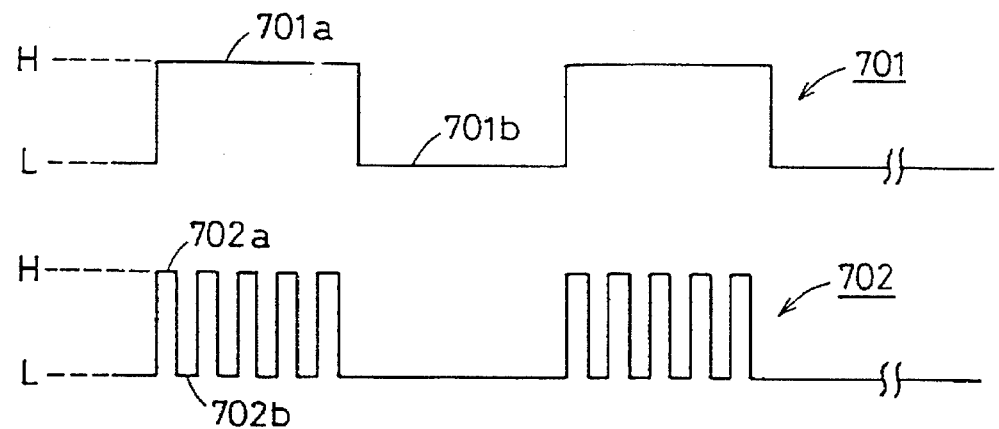
FIG. 3 is a diagram showing a modulation signal for modulating an interrogating signal.

As shown in FIG. 3, a modulation signal is often a binary digital data of a high potential portion H (for example, reverse bias 3.6 V) and a low potential portion L, for example, 0 V). Signal train 701 is the transmission data to be transmitted, comprising a high potential portion 701a and a low potential portion 701b. If impedance converter 302a is adjusted so that interrogating signal 1a received by transmission antenna 301 is totally reflected when the modulation signal attains a high potential portion 701a, and is absorbed by diode 302b when the modulation signal attains a low potential portion 701b, interrogating signal 1a has the amplitude modulated according to the high level and the low level of the transmit/receive data to be emitted.

In practice, a subcarrier is modulated according to a high level and a low level of transmit data train 701 as shown in signal train 702 of FIG. 3 to be applied to diode 302b for reducing the code transmission error. In other words, a subcarrier wave is generated when transmission data 701 attains a high potential 701a, and not generated when at low potential 701b. Interrogating signal 1a is perfectly reflected when the subcarrier attains high potential 702a, and is absorbed by diode 302b when the subcarrier attains low potential 702b. Therefore, the envelope of a response signal 1b emitted towards interrogator 1 from transmit/receive antenna 301 corresponds to modulation signal train 702. At the interrogator 1 side, response signal 1b is received by antenna 101 to be demodulated to the original data by transmitter/receiver 102. The demodulated data is applied to input/output terminal device 2 to be stored and displayed if required.

The transmission of data from interrogator 1 to transponder 3a is carried out as follows. An instruction for data transmission and a transmission data are applied from input/output terminal device 2 to transmitter/receiver 102 of interrogator 1. A carrier from an oscillator in transmitter/receiver 102 is modulated according to the transmission data. The carrier wave is often directly amplitude-modulated (ASK) by the transmission data in the case of this modulation. The modulated carrier is emitted from antenna 101 as a rewrite signal 1c. At the transponder 3a side, rewrite signal 1c is received by transmit/receive antenna 301 to be applied to modulator/demodulator 302A.

Because impedance converter 302a is adjusted (matched) so that interrogating signal 1a is absorbed by diode 302b when the modulation signal at the time of data readout from transponder 3a attains low potential 702b, modulator/demodulator 302A is at a matched state even in the case rewrite signal 1c is received (diode 302b is at a non-biased state). Thus, effective demodulation is carried out by diode 302b. The demodulated data is provided and stored in controller 303a and may be displayed by display 304.

In the case where electromagnetic wave of the microwave range is used as the communication medium, a print antenna formed on a dielectric substrate may be used as transmit/receive antenna 301. Furthermore, impedance converter 302a and bias circuit 302c may also be formed on the dielectric substrate as a microstrip line. A diode of a glass sealing type or a plastic mold type may be used as diode 302b. Controller 303a may be realized with one custom IC chip. A thin type liquid crystal display of dot matrix may be used as display 304. Therefore, the entire transponder 3a can be reduced in size and weight to be very thin and compact.

Figure 4:
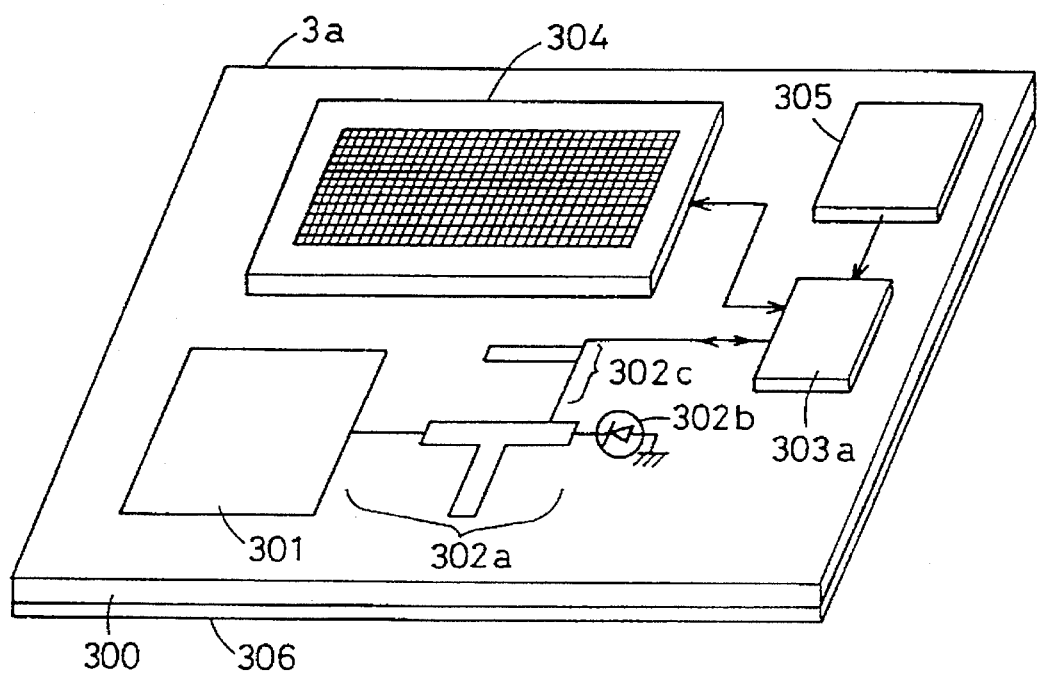
FIG. 4 is a schematic perspective view of the transponder according to the first embodiment of the present invention.

Transponder 3a of such a structure is shown perspectively and schematically in FIG. 4. This transponder 3a comprises a dielectric substrate 300, a ground conductor 306, and a thin battery 305. The reference characters denoted to the other components correspond to those of FIG. 1.

Transponder 3a of the first embodiment has advantages such as the radio portions of transmit/receive antenna 301 and modulator/demodulator 302A can be made thin, compact, and at a low cost, the battery lifetime of the radio portion thereof can be expanded significantly because hardly no consumption power is used at the radio portions, the memory contents can be read out and rewritten, the communication distance can be increased, the attaching accuracy of the transponder is not critical, and there is no affect of oil stain and dirt.

By using a liquid crystal display of dot matrix as display 304, data sent from interrogator 1 to transponder 3a and data held in transponder 3a may be displayed as characters. The personnel can read the data to allow instructions to be provided to the working party of the production line.

The data can be displayed as a bar code in dot matrix by an instruction from interrogator 1. Therefore, data in transponder 3a can also be read out by a bar code reader. In this case, this gives the advantage that it is possible to rewrite the bar code.

Thus, according to the remote identification system of the present invention, it is possible to carry out communication by electromagnetic wave where the communication distance is increased in the production line, where oil stain and dirt is severe, and where it is difficult to improve the relative position accuracy of the interrogator and the transponder. In the case where there is no oil stain or the communication distance is short, a bar code reader can be used. In the case where instruction is to be applied directly to the working party, it is possible to display characters on the display. Thus, the transponder according to the present invention allows the selection of an appropriate interrogator for each working step to establish a production control system of high efficiency at a low cost.

Figure 2:
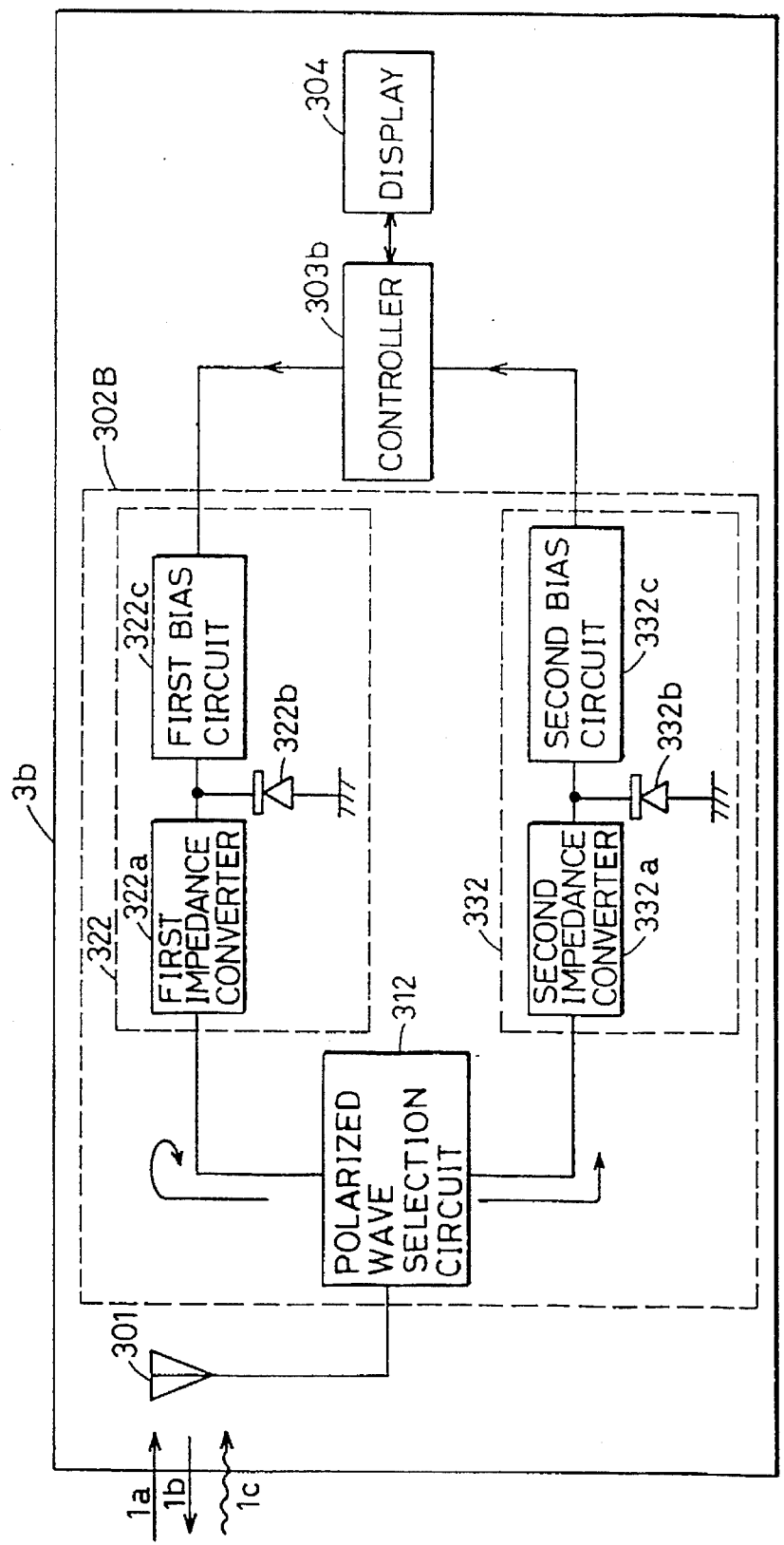
FIG. 2 is a circuit block diagram of a transponder according to a second embodiment of the present invention.

A transponder according to a second embodiment of the present invention will be explained hereinafter with reference to FIG. 2. This transponder 3b comprises a transmit/receive antenna 301, a polarized wave selection circuit 312, a reflection type modulator 322, a demodulator 332, a controller 303b, and a display 304. Reflection type modulator 322 comprises a first impedance converter 322a, a first diode 322b and a bias circuit 322c for applying a modulation signal to first diode 322b. Demodulator 332 comprises a second impedance converter 332a, a second diode 332b, and a second bias circuit 332c for providing a signal demodulated by second diode 332b. Polarized wave selection circuit 312, reflection type modulator 322 and demodulator 332 implement a modulator/demodulator 302B.

Interrogator 1 reads out data in transponder 3b as follows. Interrogator 1 emits an unmodulated carrier as interrogating signal 1a. Interrogating signal 1a is received by transmit/receive antenna 301 of transponder 3b to be provided to the side of reflection type modulator 322 by polarized wave selection circuit 312. A modulation signal according to the readout data is provided from controller 303b. This modulation signal is applied to first diode 322b via first bias circuit 322c. The signal explained in association with FIG. 3 of the first embodiment may be used, for example, as a modulation signal.

If first impedance converter 322a is adjusted so that the applied interrogating signal 1a is perfectly reflected or absorbed according to the modulation signal attaining a high potential or a low potential, the reflected wave has the amplitude modulated. This reflected wave is re-emitted as a response signal 1b from transmit/receive antenna 301 via polarized wave selection circuit 312. Interrogator 1 receives response signal 1b by antenna 101 to demodulate the signal into the original data by transmitter/receiver 102. The demodulated data is provided to input/output terminal device 2 to be stored and displayed if necessary.

Interrogator 1 transmits data to transponder 3b as follows. A carrier modulated according to a transmission data is emitted from interrogator 1 as a rewrite signal 1c. Direct amplitude-modulation with the transmission data is often used as the method of modulation, as described in the first embodiment. Rewrite signal 1c is received by transmit/receive antenna 301 of transponder 3b to be provided to the demodulator 332 side by polarized wave selection circuit 312.

If second impedance converter 332a is adjusted so that rewrite signal 1c is absorbed (matched) by second diode 332b, efficient demodulation can be carried out with second diode 332b. The demodulated signal is derived by a second bias circuit 332c to be provided to controller 303b. This data may be stored in controller 303b or displayed as characters or a bar code in display 304 if required.

In the case where electromagnetic wave of the microwave range is used as the communication medium, transmit/receive antenna 301 may be provided as a print antenna, and polarized wave selection circuit 312, first and second impedance converters 322a and 332a, and first and second bias circuits 322c and 332c may be provided as a microstrip line, as described in the aforementioned first embodiment. A diode of the glass sealing type or the plastic mold type may be used as the first and second diodes. Controller 303b may be realized with one custom IC chip, and display 304 may use a thin type liquid crystal display of dot matrix.

Figure 5:
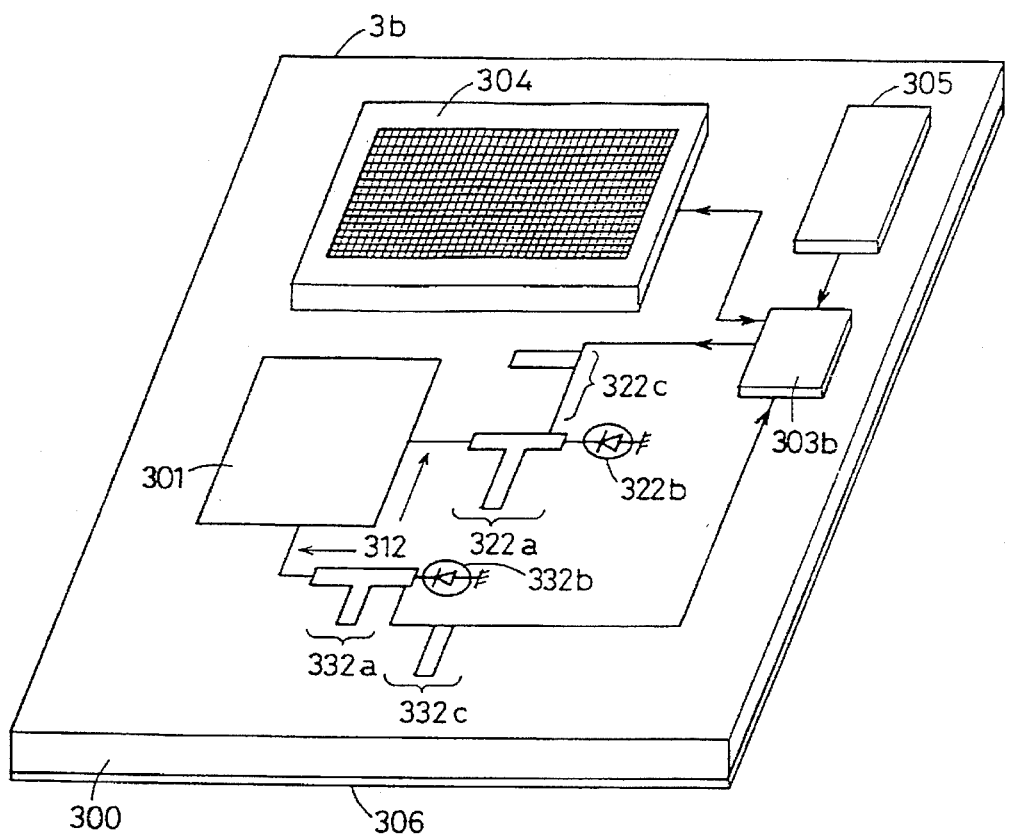
FIG. 5 is a schematic perspective view of the transponder according to the second embodiment of the present invention.
Figure 6:
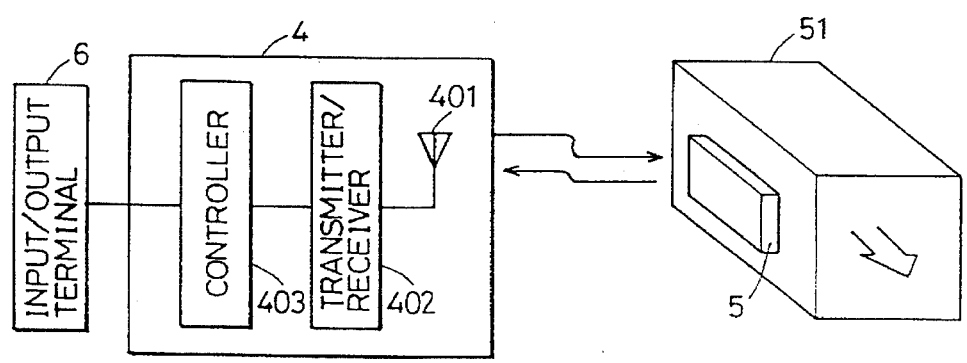
FIG. 6 is a diagram for explaining a remote identification system comprising an interrogator and a transponder.
Figure 7:
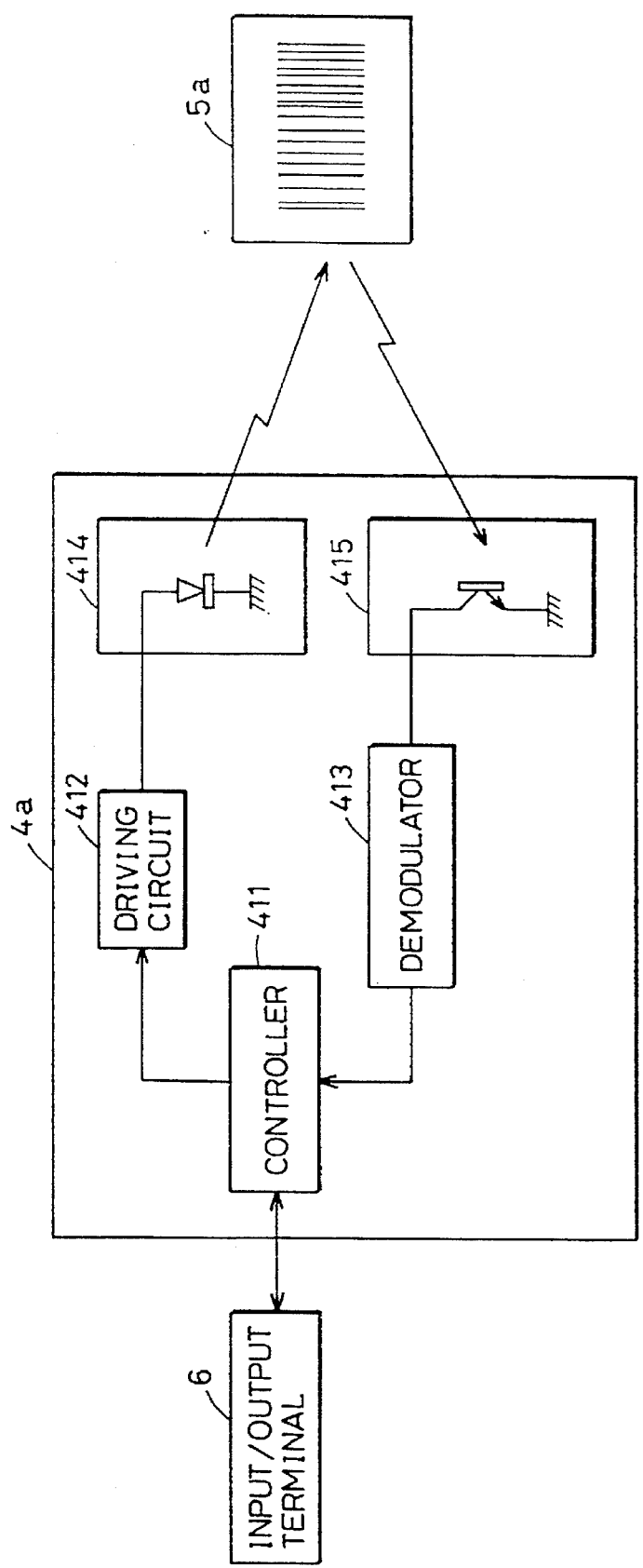
FIG. 7 is a circuit block diagram of a conventional bar code reader system.
Figure 8:
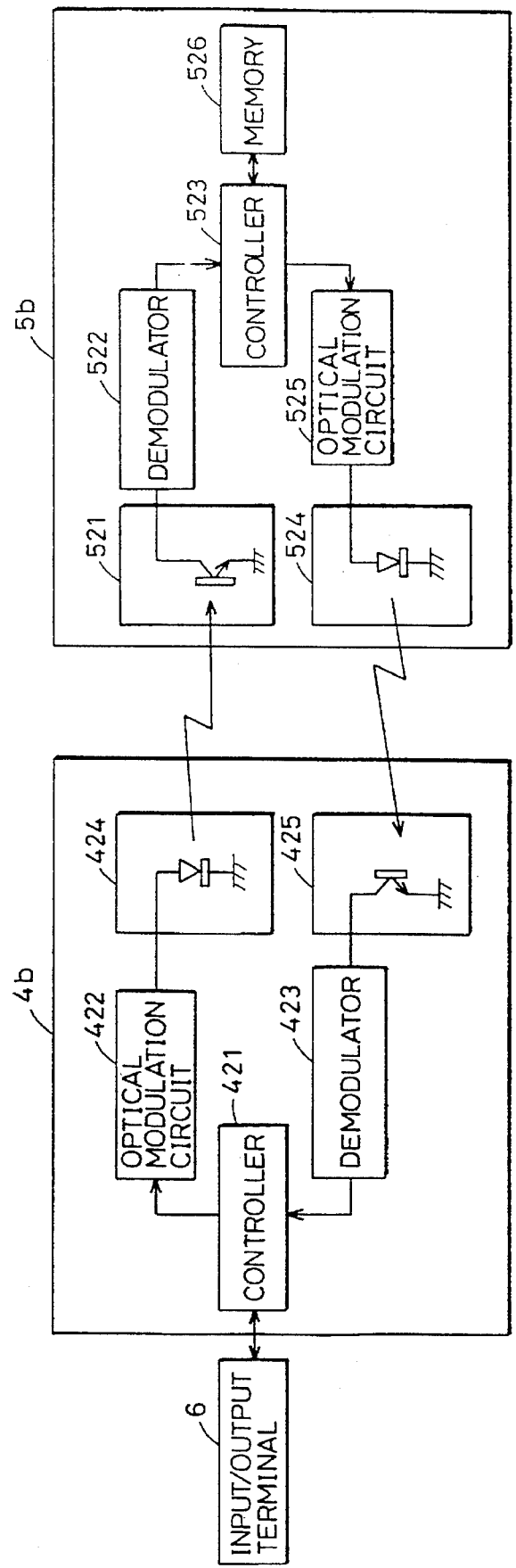
FIG. 8 is a circuit diagram of a conventional remote identification system by optical communication.
Figure 9:
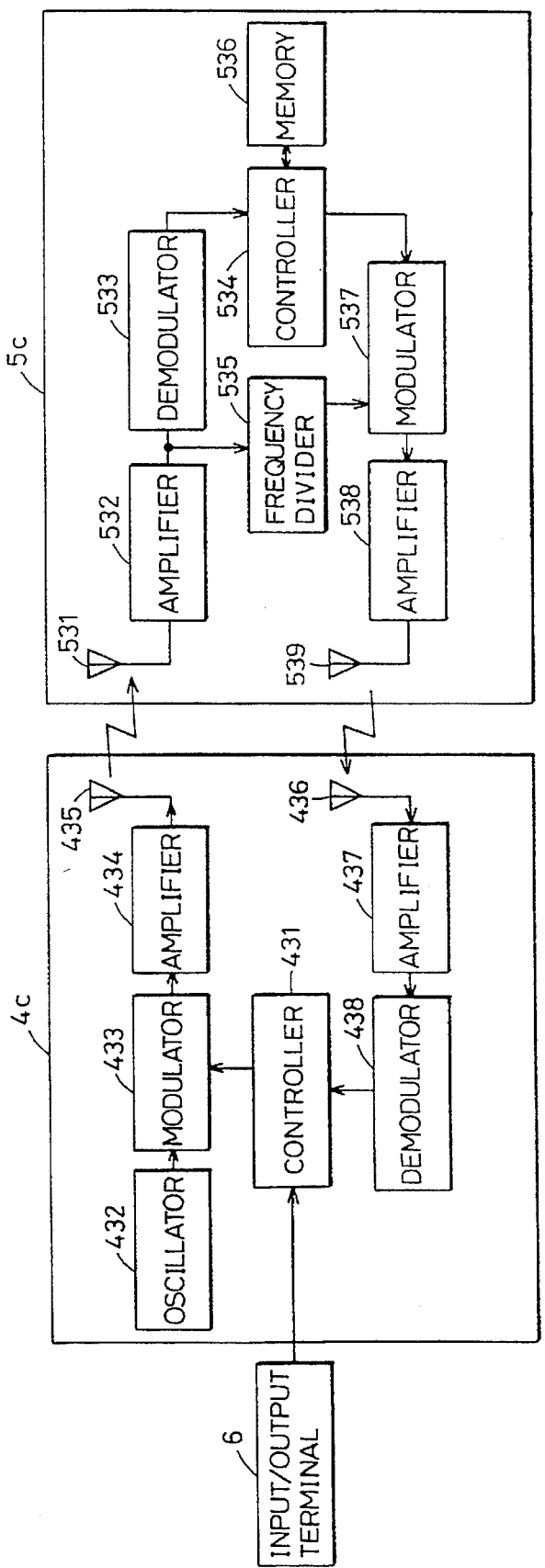
FIG. 9 is a circuit block diagram showing a conventional remote identification system using electromagnetic wave of the medium frequency range.

The transponder 3b of the above described structure is shown schematically and perspectively in FIG. 5. Referring to FIG. 5, transponder 3b comprises a dielectric substrate 300, a ground conductor 306, and a thin type battery 305. The reference characters of the other components correspond those of FIG. 2.

In addition to the advantages of the first embodiment, the second embodiment has advantages such as the degree of recognition of the signal is improved since different polarized wave is used for reading and rewriting of data of transponder 3b, and the effect of wave interference and reflected wave from other adjacent systems are reduced. Because the modulation circuit and the demodulation circuit are separate circuits, an impedance converter optimized for each circuit can be used to form a highly effective reflection type modulator 322 and demodulator 332. Thus, a transponder for a remote identification system of higher reliability can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transponder for use in a remote identification system requiring an interrogator, the transponder, comprising:

a transmit/receive antenna for receiving an interrogating signal and a rewrite signal emitted from said interrogator, and for emitting a response signal towards said interrogator, a modulator/demodulator for receiving said interrogating signal and for emitting said response signal from and to the transmit/receive antenna, the response signal being formed of a pattern of one of total reflection of the interrogating signal and absorption, the pattern being determined according to a modulation signal, the modulation signal being a function of a code specifically related to said transponder, thereby forming the response signal without newly applying energy to said interrogating signal, and for demodulating said rewrite signal, wherein said modulator/demodulator includes:

a polarized wave selection circuit, operatively connected to a reflection type modulator, and a demodulator, said reflection type modulator including a first impedance converter operatively connected to a first bias circuit, the converter and bias circuit formed as micro strip lines and a first diode operatively connected to the first impedance converter;

said demodulator including a second impedance converter operatively connected to a second bias circuit, the converter and bias circuit formed as micro strip lines and a second diode operatively connected to the second impedance converter;

said polarized wave selection circuit directing said interrogation signal received by said transmit/receive antenna to said reflection type modulator, and directing said rewrite signal to said demodulator, a dielectric substrate having a first surface and a second surface oppositively opposed to each other, said polarized wave selection circuit, said first impedance converter, said first bias circuit, said second impedance converter, said second bias circuit and said first and second diodes located on said first surface and operatively connected to each other, a ground conductor formed on said second surface, a controller for applying a modulation signal generated according to said code to said modulator/demodulator, and for storing a signal demodulated by said modulator/demodulator, a liquid crystal display of dot matrix for displaying various types of data operatively connected to said controller, said reflection type modulator modulating said interrogating signal according to said modulation signal from said controller to emit said modulation signal as said response signal to said transmit/receive antenna via said polarized wave selection circuit, said demodulator demodulating said rewrite signal and providing the rewrite signal to said controller, and a battery operatively connected to the controller for supplying power, the transmit/receive antenna is in a microwave range, and the two impedance converters are each optimized for their respective modulator and demodulator circuits, whereby the impedance converter of the reflection type modulator is adjusted so that the applied interrogating signal is perfectly reflected or absorbed according to the modulation signal attaining high or low potential and the impedance converter of the demodulator is adjusted so that the rewrite signal is absorbed by the diode of the demodulator so that demodulation is carried out by the diode and a demodulated signal is derived by the bias circuit of the demodulator and provided therefrom to the controller.

2. The transponder according to claim 1 wherein said transmit/receive antenna comprises a print antenna formed on said first surface of said dielectric substrate.

3. The transponder according to claim 1, further including means for presenting bar codes in dot matrix on the liquid crystal display, so that the bar code can be read by a bar code reader.

4. The transponder according to claim 3, wherein the bar codes can be rewritten.

5. A transponder for use in an identification system requiring an interrogator, said transponder, comprising:

a dielectric substrate having a first surface and a second surface oppositively opposed to each other, the dielectric substrate having mounted on the first surface:

a transmit/receive antenna, a modulator/demodulator operatively connected to the transmit/receive antenna, the modulator/demodulator including a micro-strip line impedance converter operatively connected to a micro-strip line bias circuit and a diode operatively connected to the impedance converter, a controller operatively connected to the modulator/demodulator, a flat battery operatively connected to the controller, a liquid crystal dot matrix display operatively connected to the controller, and a ground conductor mounted on said second surface, wherein the impedance converter is adjusted so that an applied interrogating signal is totally reflected or absorbed according to a modulation signal attaining high or low potential to emit a response signal, the response signal being formed of a pattern of one of total reflection of the interrogating signal add absorption, the pattern being determined according to a modulation signal, the modulation signal being a function of a code specifically related to the transponder thereby forming a response signal without newly applying energy to the interrogating signal, and that the diode is at a non-biased state to carry out demodulation of a rewrite signal to provide demodulated data to the controller.

* * * * *